United States Patent
Rotem et al.

(10) Patent No.: US 10,671,147 B2
(45) Date of Patent: Jun. 2, 2020

(54) DYNAMIC POWER MANAGEMENT FOR ARTIFICIAL INTELLIGENCE HARDWARE ACCELERATORS

(71) Applicant: Facebook, Inc., Menlo Park, CA (US)

(72) Inventors: Nadav Rotem, Santa Clara, CA (US); Jong Soo Park, Mountain View, CA (US); Mikhail Smelyanskiy, Burlingame, CA (US); Abdulkadir Utku Diril, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 109 days.

(21) Appl. No.: 15/846,117

(22) Filed: Dec. 18, 2017

(65) Prior Publication Data

US 2019/0187775 A1    Jun. 20, 2019

(51) Int. Cl.
  *G06F 1/00*      (2006.01)
  *G06F 1/3287*    (2019.01)
  *G06F 1/3228*    (2019.01)
  *G06F 9/38*      (2018.01)
  *G06N 5/02*      (2006.01)

(52) U.S. Cl.
  CPC .......... *G06F 1/3287* (2013.01); *G06F 1/3228* (2013.01); *G06F 9/3851* (2013.01); *G06N 5/02* (2013.01)

(58) Field of Classification Search
  CPC .... G06F 1/3287; G06F 1/3228; G06F 9/3851; G06N 5/02
  See application file for complete search history.

(56) References Cited

U.S. PATENT DOCUMENTS

| | | | | |
|---|---|---|---|---|
| 7,730,340 | B2 * | 6/2010 | Hu | G06F 1/3203 |
| | | | | 713/323 |
| 8,190,939 | B2 * | 5/2012 | Fields, Jr. | G06F 1/3203 |
| | | | | 713/324 |
| 9,311,203 | B2 * | 4/2016 | Melzer | G06F 11/267 |
| 9,921,786 | B2 * | 3/2018 | Kobayashi | G06F 3/1241 |
| 9,990,212 | B2 * | 6/2018 | Kruglick | G06F 9/44505 |
| 2013/0067261 | A1 * | 3/2013 | Carroll | G06F 1/3203 |
| | | | | 713/323 |

(Continued)

OTHER PUBLICATIONS

Chang, et. al, "Hardware accelerators for Recurrent Neural Networks on FPGA," Circuits and Systems (ISCAS), 2017 IEEE International Symposium on, May 28-31, 2017.

(Continued)

*Primary Examiner* — Aurel Prifti
(74) *Attorney, Agent, or Firm* — FisherBroyles, LLP (57) ABSTRACT

A computer-implemented method for dynamically managing the power usage and/or performance of an artificial intelligence (AI) hardware accelerator may include (1) receiving an instruction stream that includes one or more instructions for performing at least one AI-specific computing task, (2) identifying a plurality of special-purpose, hardware-based functional units configured to perform AI-specific computing tasks, (3) predicting, based on an analysis of at least a portion of the instruction stream, a power-usage requirement for at least one of the functional units when executing the instruction stream, and then (4) modifying, based on the power-usage requirement, the power supplied to at least one of the functional units. Various other methods and systems are also disclosed.

20 Claims, 9 Drawing Sheets

(56) References Cited

U.S. PATENT DOCUMENTS

| | | | | | |
|---|---|---|---|---|---|
| 2013/0346781 | A1* | 12/2013 | Chung | ............... | G06F 9/30 713/324 |
| 2014/0089699 | A1* | 3/2014 | O'Connor | ............... | G06F 1/324 713/322 |
| 2014/0189410 | A1* | 7/2014 | Wolski | ............... | G06F 1/3206 713/324 |
| 2014/0258740 | A1* | 9/2014 | Rosenzweig | ............... | G06F 1/26 713/300 |
| 2015/0046674 | A1* | 2/2015 | Barry | ............... | G06F 1/3203 712/7 |
| 2016/0116971 | A1* | 4/2016 | Luan | ............... | G06F 1/329 713/323 |
| 2016/0132329 | A1* | 5/2016 | Gupte | ............... | G06F 9/4887 718/103 |
| 2016/0179329 | A1* | 6/2016 | Wang | ............... | G06F 3/0486 715/863 |
| 2016/0239074 | A1* | 8/2016 | Lee | ............... | G06F 1/3225 |
| 2017/0060204 | A1* | 3/2017 | Gangwar | ............... | G06F 1/26 |
| 2017/0161075 | A1* | 6/2017 | Titov | ............... | G06F 9/3836 |
| 2018/0060744 | A1* | 3/2018 | Achin | ............... | G06N 20/00 |
| 2018/0095750 | A1* | 4/2018 | Drysdale | ............... | G06F 9/5044 |
| 2018/0101220 | A1* | 4/2018 | Mahindru | ............... | G06F 1/3287 |
| 2018/0120923 | A1* | 5/2018 | Srinivasan | ............... | G06F 1/266 |
| 2018/0174060 | A1* | 6/2018 | Velez-Rojas | ............... | G06N 5/02 |
| 2018/0315399 | A1* | 11/2018 | Kaul | ............... | G06N 3/0454 |

OTHER PUBLICATIONS

Kim et. al, "FPGA-Based CNN Inference Accelerator Synthesized from Multi-Threaded C Software," System-on-Chip Conference (SOCC), 2017 30th IEEE International, available at www.legupcomputing.com/static/pdfs/IEEE_SOCC_FINAL.pdf.

Kiningham et. al, "Design and Analysis of a Hardware CNN Accelerator," available at cs231n.stanford.edu/reports/2017/pdfs/116.pdf.

Warden, Pete, "Why GEMM is at the heart of deep learning," available at petewarden.com/2015/04/20/why-gemm-is-at-the-heart-of-deep-learning/.

* cited by examiner

| AI Program | MAC Utilization | DMA Utilization | SRAM Utilization |
|---|---|---|---|
| ResNet-50 | 97% | 68% | 82% |
| fastText | 37% | 92% | 95% |
| AlexNet | 89% | 87% | 83% |

DYNAMIC POWER MANAGEMENT FOR ARTIFICIAL INTELLIGENCE HARDWARE ACCELERATORS

BACKGROUND

Artificial intelligence (AI) can enable computers to perform increasingly complicated tasks, such as tasks related to cognitive functions typically associated with humans. Several approaches to AI are prevalent, including machine learning (ML) techniques. In ML, a computer may be programmed to parse data, learn from the data, and make predictions from real-world inputs. With ML, a computer may be trained using data to perform a task, rather than explicitly programmed with a particular algorithm for performing the task. One ML approach, referred to as artificial neural networks, was inspired by the interconnections of neurons in a biological brain.

Unfortunately, the complexity of many AI and ML techniques often requires the performance of a variety of computationally intensive tasks, which may tax existing computing systems to their limits. While the performance of processing units may be improved by scaling their frequency or voltage, processing units often become increasingly unstable past certain operating frequencies, voltages, and temperatures. Moreover, because general-purpose processing units are typically designed to handle a variety of unpredictable, software-based workloads, their power and performance needs are often similarly unpredictable and varied. These and other factors may make it difficult for designers to optimize the power usage and/or performance of AI and ML systems.

SUMMARY

As will be described in greater detail below, the instant disclosure describes various systems and methods for optimizing the power usage and/or performance of hardware-based AI accelerators based on an analysis of a substantially static (i.e., predictable) incoming instruction stream. In one example, a computing device capable of performing such a task may include a plurality of special-purpose, hardware-based functional units configured to perform AI-specific computing tasks. The computing device may also include an instruction stream analysis unit configured to (1) receive an instruction stream that includes one or more instructions for performing at least one AI-specific computing task, (2) predict, based on an analysis of at least a portion of the instruction stream, a power-usage requirement for at least one of the functional units when executing the instruction stream, and (3) modify, based on the power-usage requirement, power supplied to at least one of the functional units.

In some examples, the instruction stream analysis unit may predict the power-usage requirement for at least one of the functional units by (1) causing at least one of the functional units to execute an initial portion of the instruction stream, (2) observing utilization of the functional units when executing the initial portion of the instruction stream, and (3) forecasting, based at least in part on the observed utilization of the functional units when executing the initial portion of the instruction stream, a power-usage requirement for at least one of the functional units when executing the remaining portion of the instruction stream.

In one embodiment, the computing device may also include a memory device configured to store a power-utilization profile, for at least one AI program, that identifies the power-usage requirement for at least one of the functional units when executing the AI program. In this embodiment, the instruction stream analysis unit may predict the power-usage requirement for at least one of the functional units by (1) determining that the instruction stream corresponds to the AI program, (2) retrieving the power-utilization profile for the AI program from the memory device, and (3) determining, based on the power-utilization profile, the power-usage requirement for at least one of the functional units when executing the AI program.

In one example, the instruction stream analysis unit may predict the power-usage requirement by (1) identifying, based on an analysis of the instruction stream, at least one element of sparsity within the AI-specific computing task and then (2) predicting the power-usage requirement based at least in part on the identified element of sparsity. In addition, at least one of the functional units may be power gated to draw power only when in use.

In some embodiments, the instruction stream analysis unit may modify the power supplied to at least one of the functional units by scaling the frequency and/or voltage of at least one of the functional units. In addition, the instruction stream analysis unit may represent or include a general-purpose processing unit, a special-purpose processing unit, and/or a logical operation unit. The instruction stream analysis unit may be integrated within a hardware accelerator that includes the functional units and/or may be external to the hardware accelerator. In some examples, the functional units may include a multiply-accumulate unit, a direct memory access unit, and/or a memory device.

Similarly, an AI accelerator capable of optimizing its power usage may include a plurality of special-purpose, hardware-based functional units configured to perform AI-specific computing tasks. The accelerator may also include an instruction stream analysis unit configured to (1) receive an instruction stream that includes one or more instructions for performing at least one AI-specific computing task, (2) predict, based on an analysis of at least a portion of the instruction stream, a power-usage requirement for at least one of the functional units when executing the instruction stream, and (3) modify, based on the power-usage requirement, power supplied to at least one of the functional units.

A corresponding computer-implemented method may include (1) receiving an instruction stream that includes one or more instructions for performing at least one AI-specific computing task, (2) identifying a plurality of special-purpose, hardware-based functional units configured to perform AI-specific computing tasks, (3) predicting, based on an analysis of at least a portion of the instruction stream, a power-usage requirement for at least one of the functional units when executing the instruction stream, and then (4) modifying, based on the power-usage requirement, power supplied to at least one of the functional units.

In one example, predicting the power-usage requirement for at least one of the functional units may include (1) executing an initial portion of the instruction stream, (2) observing utilization of the functional units when executing the initial portion of the instruction stream, and (3) forecasting, based at least in part on the observed utilization of the functional units when executing the initial portion of the instruction stream, a power-usage requirement for at least one of the functional units when executing the remaining portion of the instruction stream.

In one embodiment, the method may include, prior to receiving the instruction stream, storing a power-utilization profile, for at least one AI program, that identifies the power-usage requirement for at least one of the functional units when executing the AI program. In this embodiment, predicting the power-usage requirement for at least one of the functional units may include (1) determining that the instruction stream corresponds to the AI program, (2) retrieving the power-utilization profile for the AI program from a memory device, and (3) determining, based on the power-utilization profile, the power-usage requirement for at least one of the functional units when executing the AI program.

In some examples, predicting the power-usage requirement may include (1) identifying, based on an analysis of the instruction stream, at least one element of sparsity within the AI-specific computing task and then (2) predicting the power-usage requirement based at least in part on the identified element of sparsity.

In some embodiments, at least one of the functional units may be power gated to draw power only when in use. In addition, modifying the power supplied to at least one of the functional units may include scaling the frequency and/or voltage of at least one of the functional units.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to dynamically managing the power usage and/or performance of hardware-based AI accelerators. Unlike most software, the computational workloads required by AI-specific computing tasks and programs are often highly stable and predictable. The disclosed systems may leverage the regular and repeated nature of AI-specific workloads to accurately and precisely predict how much power will be required by discrete functional units (e.g., multiply-accumulate (MAC) units, static random-access memory (SRAM) devices, direct memory access (DMA) engines, etc.) of an AI accelerator when performing an AI-specific computing task. The disclosed systems may then use this prediction to optimize the power usage and/or performance of the AI accelerator (by, e.g., scaling the frequency of, and/or the voltage supplied to, the individual functional units and/or the accelerator as a whole). By doing so, embodiments of the present disclosure may be able to accelerate computation, optimize energy consumption, reduce heat generation, and/or provide a variety of other features and benefits to AI computing.

Turning to the figures, the following will provide, with reference to FIGS. 1-4, detailed descriptions of exemplary systems and methods for dynamically managing the power usage and/or performance of an AI accelerator based on an analysis of an AI-related instruction stream. The description corresponding to FIG. 5 will describe a substantially real-time approach to analyzing instruction streams, while the description corresponding to FIG. 6 will detail a profile-based approach. Finally, the description corresponding to FIGS. 7-9 will detail an exemplary neural network, convolutional neural network (CNN), and client-server network capable of benefiting from one or more of the embodiments described herein.

Figure 1:
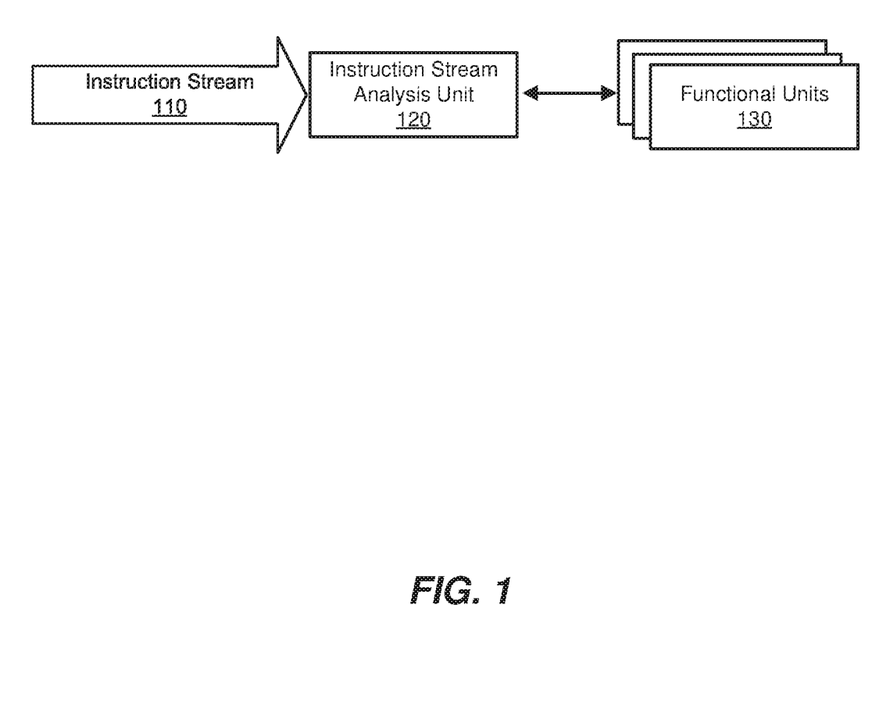
FIG. 1 is a block diagram of an exemplary instruction stream analysis unit capable of analyzing and predicting power-usage requirements for AI-specific instruction streams.
Figure 2:
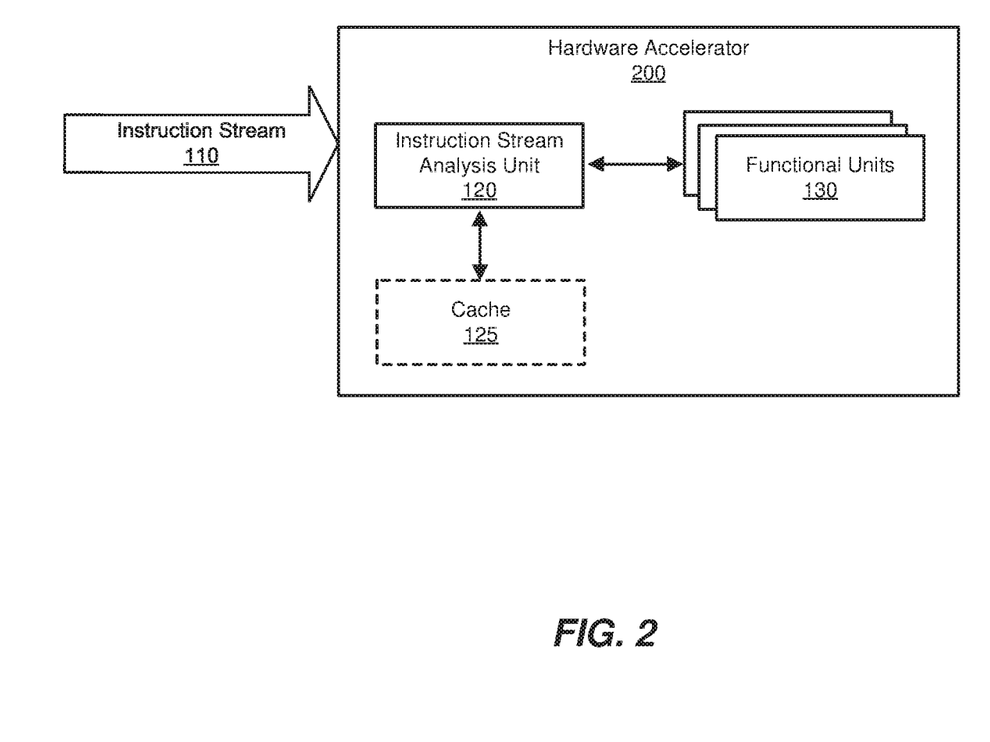
FIG. 2 is a block diagram of an exemplary hardware accelerator including the instruction stream analysis unit from FIG. 1.
Figure 3:
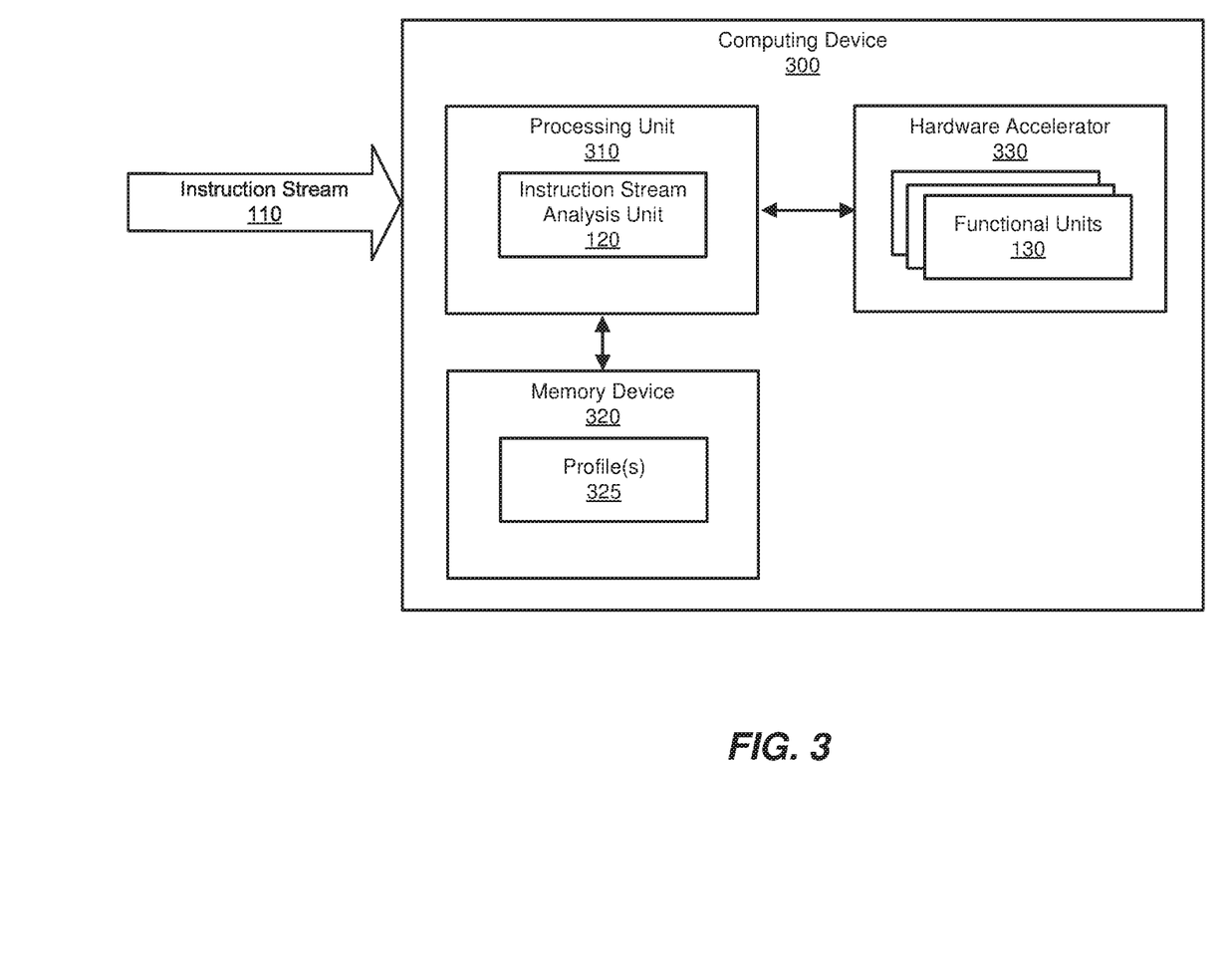
FIG. 3 is a block diagram of an exemplary computing device including the instruction stream analysis unit from FIG. 1.

FIGS. 1-3 are block diagrams of exemplary computing components and/or devices capable of implementing one or more of the embodiments described herein. As will be described in greater detail below, an instruction stream analysis unit (such as instruction stream analysis unit 120 in FIGS. 1-3) may be configured to manage the power usage and/or performance of an AI accelerator (which may include, for example, a variety of functional units, such as functional units 130) based on an analysis of a substantially static or predictable instruction stream (such as instruction stream 110) to be executed by the AI accelerator.

Instruction stream analysis unit 120 generally represents any type or form of computing device or component capable of analyzing all or a portion of a stream of computing instructions, such as computing instructions associated with an AI-specific computing program or task. Instruction stream analysis unit 120 may be designed or configured in a variety of ways. In one example, and as illustrated in FIG. 1, instruction stream analysis unit 120 may represent a standalone hardware component. In another example, as illustrated in FIG. 2, instruction stream analysis unit 120 may be integrated within a hardware accelerator, such as hardware accelerator 200. The role of an instruction stream analysis unit 120 may also be played by other computing components, such as processing unit 310 of computing device 300 in FIG. 3. For example, as illustrated in FIG. 3, instruction stream analysis unit 120 may represent a module or other software component that is executed, for example, by the central processing unit (CPU) of a general-purpose computing device (e.g., processing unit 310 of computing device 300) and configured to analyze AI-based instruction streams and send frequency-scaling commands to additional hardware devices, such as hardware accelerator 330. In other words, instruction stream analysis unit 120 may represent and/or be executed by or integrated within a variety of devices, such as a general-purpose processing unit (such as the central processing unit of a general-purpose computing device), a special-purpose processing unit (such as a portion of a hardware accelerator, including the functional unit itself, a graphics processing unit (GPU), etc.), a standalone or integrated logical operation unit (such as a combinational logic operator (e.g., a multiplexer), a set of logical gates, etc.), and/or any other computing unit capable of analyzing and/or otherwise operating on instruction streams.

Figure 4:
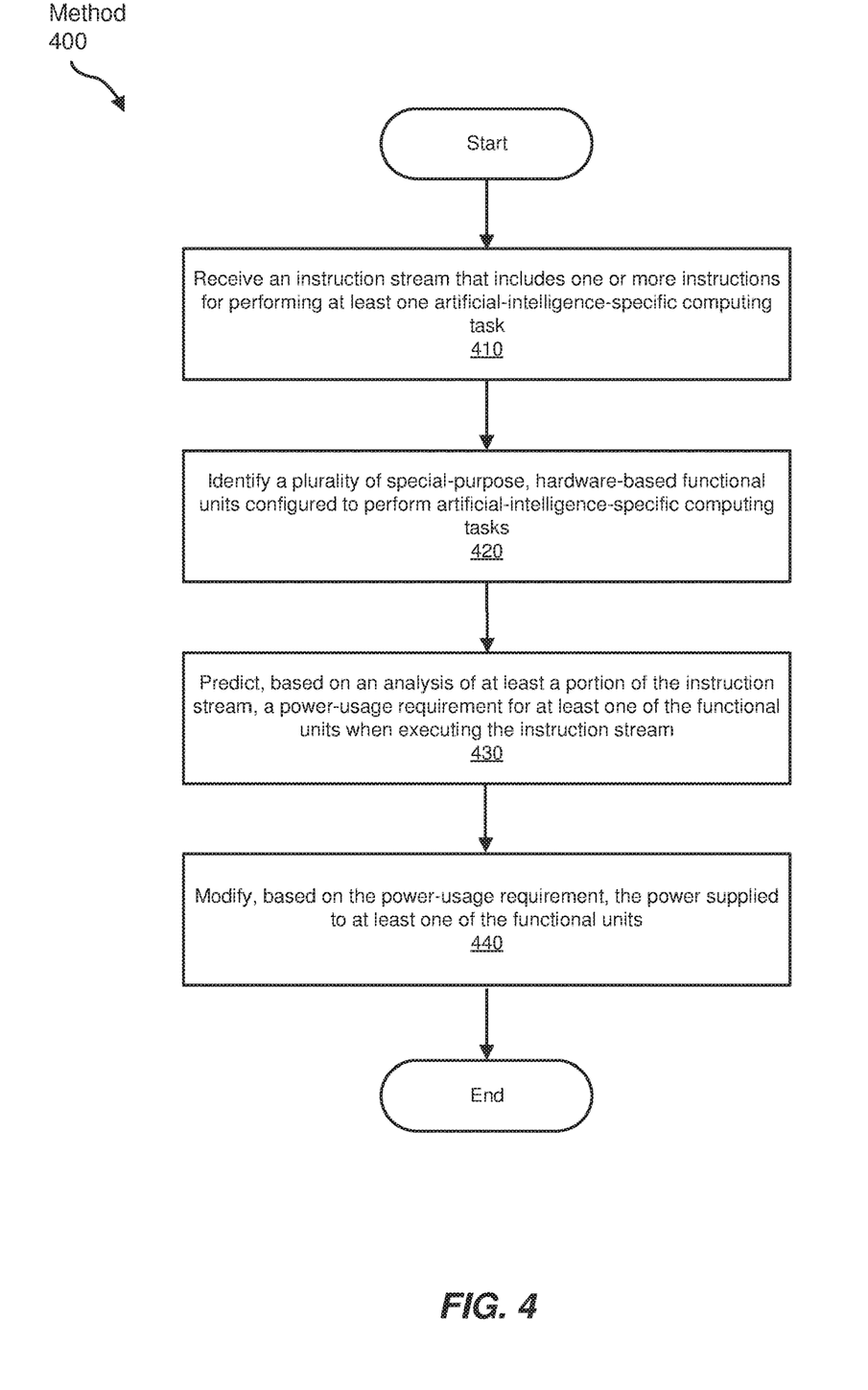
FIG. 4 is a flow diagram of an exemplary method for dynamically managing the power usage and/or performance of an AI accelerator.

In some examples, instruction stream analysis unit 120 may be configured to dynamically manage the power usage and/or performance of at least one AI accelerator based on an analysis of an AI-based instruction stream. FIG. 4 is a flow diagram of an exemplary computer-implemented method 400 for accomplishing such a task. The steps shown in FIG. 4 may be performed by any suitable computer-executable code and/or computing system, including the systems illustrated in FIGS. 1-3 and 7-9. In one example, each of the steps shown in FIG. 4 may represent an algorithm whose structure includes and/or is represented by multiple sub-steps, examples of which will be provided in greater detail below.

As illustrated in FIG. 4, at step 410 one or more of the systems described herein may receive an instruction stream that includes one or more instructions for performing at least one AI-specific computing task. For example, instruction stream analysis unit 120 may receive (e.g., as part of hardware accelerator 200 in FIG. 2, computing device 300 in FIG. 3, server 906 in FIG. 9, and/or as a standalone device) instruction stream 110.

In some examples, the term "instruction stream" may refer to a series of computer-executable instructions. In the example of step 410, these instructions may, when executed by a computing device or component, result in the performance of at least one AI-specific computing task, such as computing tasks related to training, clustering, reduction, regression, classification or inference, etc. For example, an instruction stream may include instructions for performing a particular operation on a layer of a neural network, such as a convolution operation. In some embodiments, instruction stream 110 may represent or contain instructions associated with a specific AI computing program or algorithm, such as a specific neural network (e.g., ResNet-50), natural language processing (NLP) library (e.g., FastText), clustering algorithm, decision tree, Bayesian network, deep-learning model, etc.

The systems described herein may perform step 410 in a variety of ways. In the examples illustrated in FIGS. 1-3, instruction stream analysis unit 120 may receive instruction stream 110 from a separate, external computing device. In other examples, instruction stream analysis unit 120 may receive instruction stream 110 from a discrete computing component operating within the same computing device as instruction stream analysis unit 120. For example, instruction stream analysis unit 120 may, when executing within the framework of a hardware accelerator of a computing device, receive instruction stream 110 from the central processing unit of the computing device itself. Instruction stream 110 may also be received one instruction at a time, received as a block of instructions, or received in queue.

Returning to FIG. 4, at step 420 the systems described herein may identify a plurality of special-purpose, hardware-based functional units configured to perform AI-specific computing tasks, such as the tasks received in the instruction stream of step 410. The term "special-purpose hardware" may, in some examples, refer to various types and forms of processors and other logical units and hardware elements that may be arranged, designed, or otherwise configured to perform one or more tasks more efficiently than general-purpose computing systems (e.g., general-purpose processors and/or memory devices). Examples of such functional units include, without limitation, matrix multipliers or general matrix-to-matrix multiplication (GEMM) units (which may be used, e.g., to apply filter weights to input data in a neural network, convolve layers in a convolutional neural network, etc.), DMA engines or other memory management units (which may be used, e.g., to access system memory independent of a processing unit), MAC units or other logical operator units (which may perform, e.g., the multiplication and summation operations used when performing convolution operations), caches or other memory devices (implemented using, e.g., SRAM devices, dynamic random access memory (DRAM) devices, etc.) designed to store incoming instruction streams, calculation results, data models, etc., among many others. Special-purpose functional units may be implemented in a variety of ways, including via hard-wiring and/or using application-specific integrated circuits (ASICs) or field-programmable gate arrays (FPGAs).

In some examples, the functional units identified in step 420 may represent the building blocks of a hardware accelerator, such as hardware accelerator 200 in FIG. 2. In one embodiment, hardware accelerator 200 may contain, in addition to functional units 130, a cache 125. Cache 125 may be used to store a variety of information, including buffered instructions, calculation results, model-specific data (e.g., filter weights), output data, etc.

The systems described herein may perform step 420 in a variety of ways. In some examples, the step of identifying the functional units may be subsumed within, or be part of, the step of receiving the instruction stream. In other words, since instruction stream analysis 120 may be integrated within an AI accelerator (such as hardware accelerator 200), the mere reception of instruction stream 110 may qualify as an identification of the functional units in question. In other examples, step 420 may represent a separate and distinct action from step 410. For example, instruction stream analysis unit 120 may be configured to identify the functional units and/or AI accelerators best suited to execute instruction stream 110 (based on, e.g., characteristics of the instruction stream, characteristics of the functional units, characteristics of the AI accelerator, etc.).

Returning to FIG. 4, at step 430 the systems described herein may predict, based on an analysis of at least a portion of the instruction stream, a power-usage requirement for executing the instruction stream for at least one of the functional units. For example, instruction stream analysis unit 120 may predict the power usage that functional units 130 may require to properly and/or optimally execute instruction stream 110.

The systems described herein may perform step 430 in a variety of ways. For example, and as explained in greater detail below, instruction stream analysis unit 120 may predict a power-usage requirement based on a substantially real-time analysis of at least a portion of the instruction stream, based on various traits of the instruction stream (e.g., computational operations or workloads contained within the instruction stream), based on an AI program associated with the instruction stream (e.g., if instruction stream 110 is associated with the ResNet-50 program, instruction stream analysis unit 120 may identify and retrieve a power-utilization profile custom-designed for RestNet-50 workloads), based on the source of the instruction stream (e.g., if instruction stream 110 originated from a computing device known to supply convolutional neural network workloads, then instruction stream analysis unit 120 may identify and retrieve a power-utilization profile custom-designed for convolutional neural network workloads), based on the intended destination for the instruction stream (e.g., if instruction stream 110 is directed to an AI accelerator designed for use with NLP models, then instruction stream analysis unit 120 may identify and retrieve a power-utilization profile custom-designed for NLP workloads), among many other potential prediction approaches.

Figure 5:
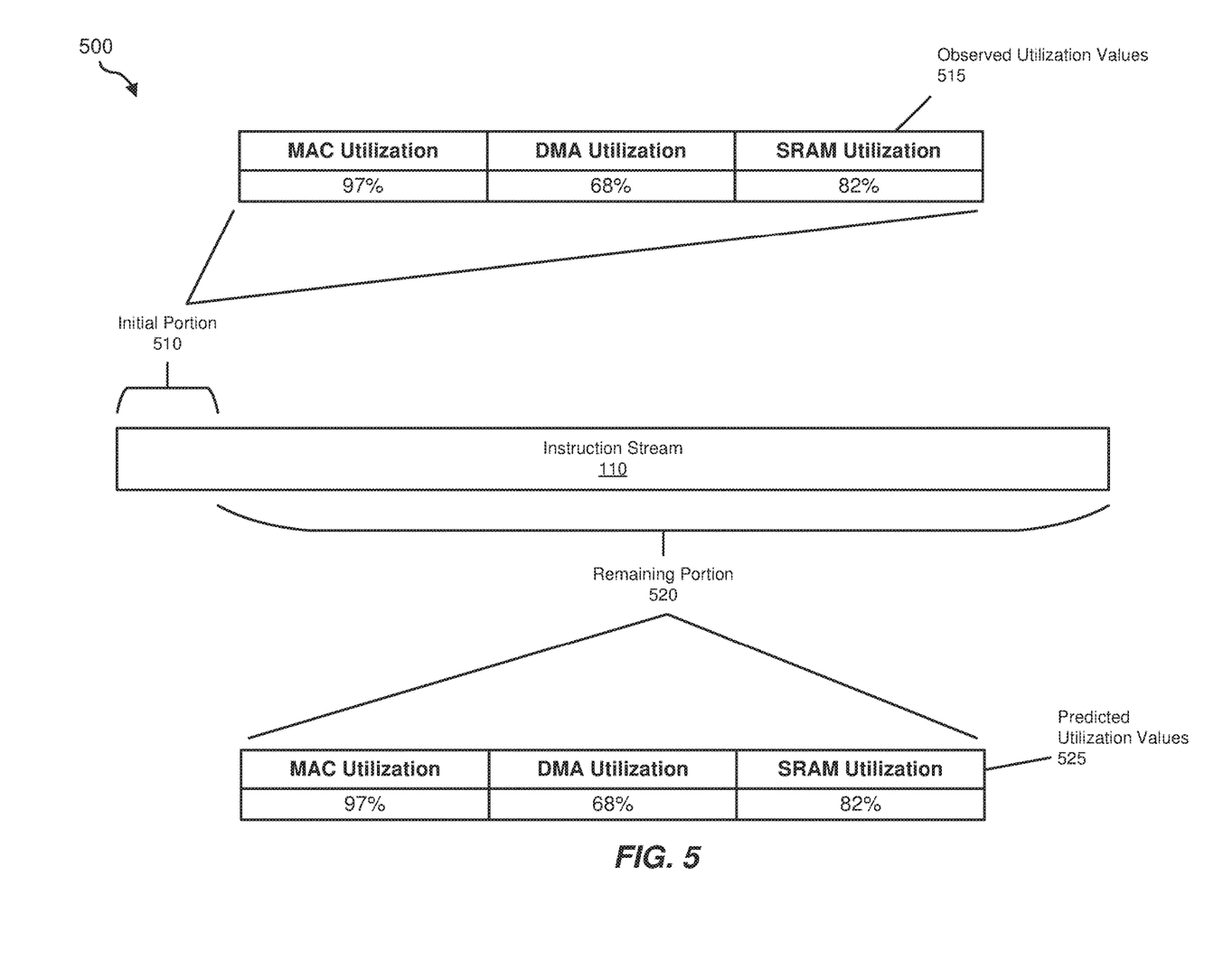
FIG. 5 is a block diagram of an exemplary real-time approach to analyzing AI-specific instruction streams.

FIG. 5 is an example diagram of a substantially real-time approach to predicting power-usage requirements for AI accelerators. In this example, instruction stream analysis unit 120 may cause at least one of functional units 130 to execute an initial portion 510 of instruction stream 110 (i.e., less than the entirety of instruction stream 110) by, for example, sending initial portion 510 to hardware accelerator 200. During the execution of initial portion 510, instruction stream analysis unit 120 may observe and determine how much each functional unit 130 is utilized. In the example illustrated in FIG. 5, instruction stream analysis unit 120 may observe that the execution of initial portion 510 by hardware accelerator 200 utilizes 97% of the hardware accelerator's MAC unit, 68% of the hardware accelerator's DMA engine, and 82% of the hardware accelerator's SRAM (represented as observed utilization values 515).

Unlike most software, because the computational workloads required by AI-specific computing tasks and programs are highly stable and predictable, instruction stream analysis unit 120 may use observed utilization values 515 to accurately and precisely predict utilization values for the remaining portion of instruction stream 110. For example, AI-specific workloads typically involve performing a regular and repeated set of computing operations and tasks, such as convolve→rectify→pool in the case of convolutional neural networks. As such, instruction stream analysis unit 120 may take advantage of the predictable nature of AI workloads to accurately forecast and predict utilization values (and, thus, power-usage requirements) for the functional units of an AI accelerator.

For example, and as illustrated in FIG. 5, instruction stream analysis unit 120 may predict or forecast a set of utilization values (e.g., predicted utilization values 525) for a remaining portion 520 of instruction stream 110 based on the utilization values (e.g., observed utilization values 515) identified or recorded during the execution of initial portion 510. In this example, because the utilization of functional units 130 during remaining portion 520 is unlikely to significantly change (due to, e.g., the stable and predictable nature of AI-specific workloads), instruction stream analysis unit 120 may forecast utilization values for the remaining portion 520 that closely or perfectly match the values that that were observed during the execution of initial portion 510. In the example illustrated in FIG. 5, instruction stream analysis unit 120 may predict that the execution of remaining portion 520 by hardware accelerator 200 will utilize 97% of the hardware accelerator's MAC unit, 68% of the hardware accelerator's DMA engine, and 82% of the hardware accelerator's SRAM (represented as predicted utilization values 525).

In some examples, the predicted utilization values may be used to determine the power-usage requirement for an AI accelerator and/or one or more functional units within the same. For example, if instruction stream analysis unit 120 determines that a MAC unit of an AI accelerator will be operating at 97% capacity when executing instruction stream 110, then instruction stream analysis unit 120 may identify a frequency and/or voltage (i.e., a near-max frequency and/or voltage) sufficient to enable the MAC unit to stably run at 97% capacity. Conversely, if instruction stream analysis unit 120 determines that a DMA unit of an AI accelerator will be operating at 11% capacity when executing instruction stream 110, then instruction stream analysis unit 120 may identify a frequency and/or voltage (i.e., a near-minimum voltage and/or frequency) sufficient to enable the DMA unit to stably run at 11% capacity. In some examples, these utilization values may either directly represent an appropriate frequency and/or voltage to supply to the AI accelerator and/or functional unit in question and/or may be used to determine the appropriate frequency and/or voltage.

The systems described herein may determine power-usage requirements in a variety of ways to accomplish a variety of goals. In one example, the disclosed systems may determine power-usage requirements on a per-functional-unit basis. For example, instruction stream analysis unit 120 may determine, for a specific instruction stream, the power-usage requirements for each individual functional unit within an AI accelerator. The disclosed systems may also determine power-usage requirements on a per-accelerator basis based on, for example, aggregated or averaged values for each individual functional unit and/or for the AI accelerator as a whole.

Figure 6:
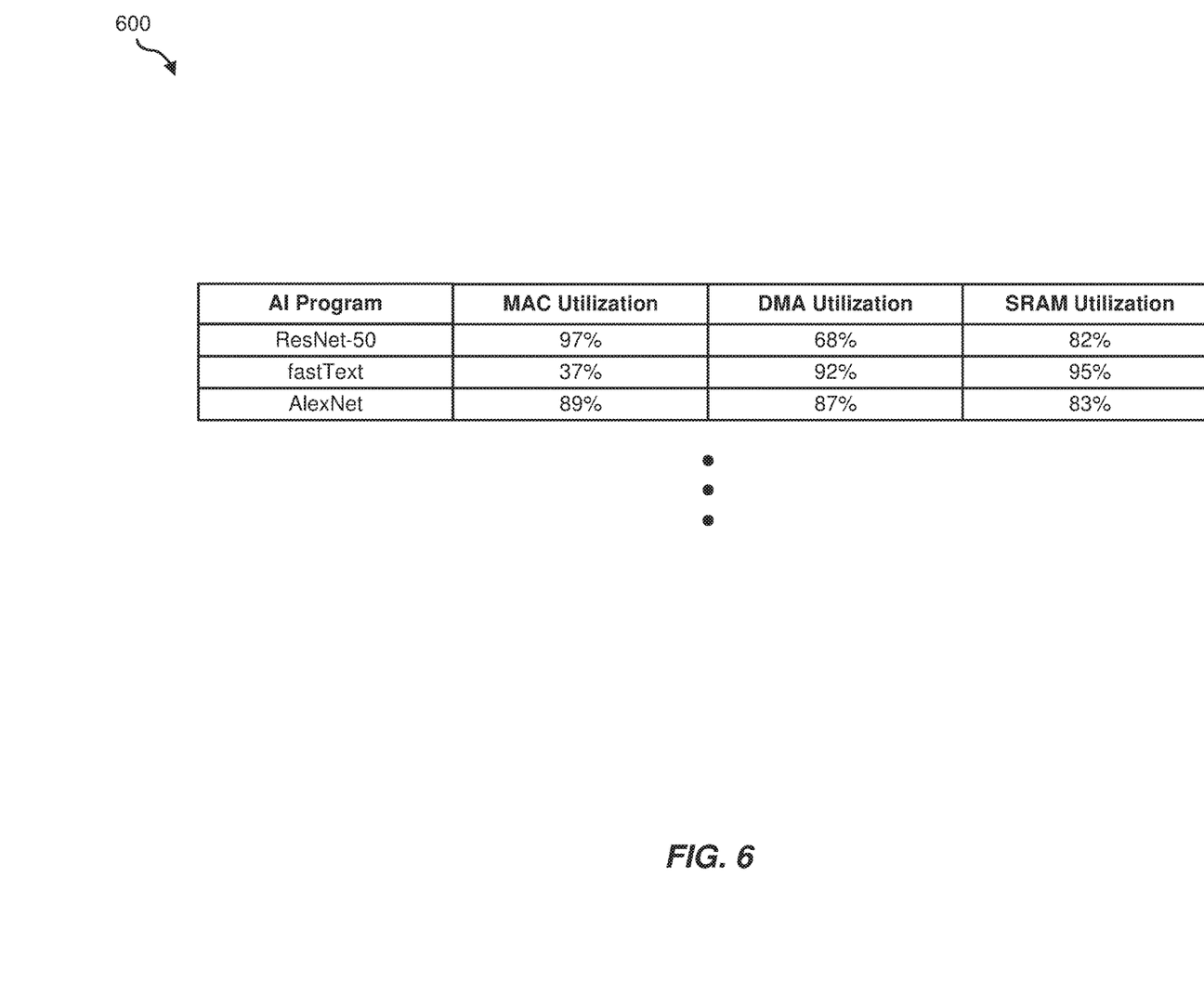
FIG. 6 is a block diagram of an exemplary profile-based approach to analyzing AI-specific instructions streams.

In some examples, the observed utilization values described above may be used to create power-utilization profiles for specific instruction streams and/or AI programs. FIG. 6 contains an illustration of an exemplary table 600 containing data that may either represent such profiles or may be used to create the same. In the example illustrated in this figure, table 600 identifies the likely extent to which each functional unit within an AI accelerator will be used during the execution of a specific AI program. In this example, table 600 may indicate that the convolutional neural network program "ResNet-50" will likely utilize 97% of an accelerator's MAC unit, 68% of the accelerator's DMA unit, and 82% of the accelerator's SRAM, while the NLP program "fastText" will likely utilize 37% of the accelerator's MAC unit, 92% of the accelerator's DMA unit, and 95% of the accelerator's SRAM. As detailed above, these utilization values may either directly represent an appropriate frequency and/or voltage to supply to the AI accelerator and/or functional unit in question and/or may be used to select or calculate the frequency and/or voltage that may be needed to stably execute at the predicted utilization rate.

Although the utilization data illustrated in FIG. 6 is represented in table form, this data may be stored in any appropriate data structure format, such as a hash table, matrix, vector, etc. Utilization data may also be stored in more than one data structure and/or storage device. In one example, instruction stream analysis unit 120 may store the utilization data from table 600 (or a conclusion or inference drawn from this data) within cache 125 in FIG. 2. As described above, functional unit utilization data may be represented in a variety of ways. For example, utilization data may be represented by an indication of which functional units are being utilized and/or how much each functional unit is being utilized (represented, for example, on a percentage or discrete basis). Functional unit utilization may also be represented in contextual terms (e.g., via an indication of an optimal frequency or clock rate for a particular utilization workload, a voltage value or range needed for optimal or stable processing of a particular workload, a scaling value that may optimize or maximize one or more functional parameters such as throughput or accuracy, etc.).

In some embodiments, the systems described herein may use power-utilization profiles to predict, for a computing workload associated with a particular AI program, the power-usage requirement of a functional unit and/or AI accelerator. For example, instruction stream analysis unit 120 may first determine that instruction stream 110 corresponds to a particular AI program, such as ResNet-50. This determination may be based on a variety of factors, including the source of the instruction stream, the intended destination of the instruction stream, a metadata flag within the instruction stream, an option selected by a user, etc. Upon identifying the implicated AI program, instruction stream analysis unit 120 may retrieve a power-utilization profile for that specific AI program from memory (e.g., from cache 125). Instruction stream analysis unit 120 may then use this power-utilization profile to determine the power-usage requirement for the AI program in question.

In some examples, one or more of the functional units within the disclosed AI accelerator may be power gated so that they only draw power when in use. For example, hardware accelerator 200 may be designed to shut off blocks of current to functional units 130 when they are not in use. By doing so, hardware accelerator 200 may reduce or eliminate standby power consumption and/or power leakage.

In some embodiments, the power-usage requirement for a functional unit and/or AI accelerator may be predicted based on the data that is to be processed. For example, the weights of a data model, such as filter maps for a convolutional layer within a neural network, may be analyzed to predict how active a functional unit, such as a MAC unit, will be when operating on the data. How much power the MAC unit will use may then be predicted based on the sparsity (i.e., the amount of zero-value elements) within a weight matrix. In certain operations, such as multiply-accumulate operations performed by a MAC unit, zero-value elements will produce a value of zero when operated on. As such, sparse elements may not require as much processing power (e.g., computations) non-sparse elements, and therefore the sparsity of a weight matrix may be indicative of the power-usage requirement for a particular AI workload. Accordingly, in some examples the disclosed systems may predict the power-usage requirement for a particular instruction stream by (1) identifying at least one element of sparsity within the instruction stream and then (2) predicting a power-usage requirement for a functional unit and/or set of functional units (e.g., an entire AI accelerator) based at least in part on the identified element of sparsity.

Returning to FIG. 4, at step 440 the systems described herein may modify, based on the predicted power-usage requirement, the power supplied to at least one of the functional units. For example, instruction stream analysis unit 120 may modify the power supplied to functional units 130 and/or hardware accelerator 200 based on a power-usage requirement predicted for instruction stream 110.

The systems described herein may perform step 440 in a variety of ways. In some examples, the disclosed systems may modify the power supplied to a functional unit and/or AI accelerator by scaling the frequency (or clock rate) of the unit or accelerator and/or by scaling the voltage supplied to the unit or accelerator. In one example, the disclosed systems may account for the maximum power envelope of a functional unit or AI accelerator when scaling its frequency and/or voltage. In this example, the maximum power envelope may indicate the maximum power that may be supplied while still maintaining stable operation. Unstable operation may, for instance, cause physical damage to parts of the functional unit or accelerator, cause an unacceptably high number of errors in operation, or raise the temperature of the functional unit or accelerator to an unsafe level.

In some examples, the power-usage requirement predicted in step 430 may be less than the maximum power envelope for the functional unit or accelerator in question, which may indicate that additional performance may be achieved by increasing the frequency of (or voltage supplied to) the unit or accelerator. In such examples, the disclosed systems may scale the frequency and/or voltage higher (by, e.g., overclocking) until the predicted power-usage requirement approaches, but does not exceed, the maximum power envelope. In other examples, the disclosed systems may scale the frequency and/or voltage of the functional unit or accelerator well below the maximum power envelope of the functional unit or accelerator. Such an approach may be beneficial, for example, when deploying AI accelerators on low-power devices, such as mobile devices. In sum, the systems disclosed herein may modify a variety of power and/or performance characteristics of a functional unit or AI accelerator (including frequency, clock rate, voltage, etc.) in order to accomplish any number of performance and/or power-related goals and objectives, including to decrease total computation time, optimize energy consumption, reduce heat generation, etc.

In certain implementations, individual functional units may be configured to operate at different frequencies and/or voltages. In these implementations, instruction stream analysis unit 120 may scale different functional units 130 at different frequencies and/or voltages. For example, certain instructions may have higher or lower priorities than other instructions, and corresponding functional units may be scaled accordingly. In some cases, the physical locations of each functional unit 130 may also be considered. For example, the voltages and/or operating frequencies of functional units that are close in physical proximity may not be scaled as high as others in order to manage local heating.

As detailed above, by analyzing a given stream of instructions related to an AI-specific computing task, the systems disclosed herein may be able to accurately predict or estimate how much power may be required by discrete functional units (e.g., MACs, SRAM devices, DMAs, etc.) of an AI accelerator designed to perform such a task. The disclosed systems may then use this prediction to optimize the power usage and/or performance of the AI accelerator in order to accomplish a variety of goals, including accelerated computation, optimized energy consumption, and reduced heat generation, among many others.

Figure 7:
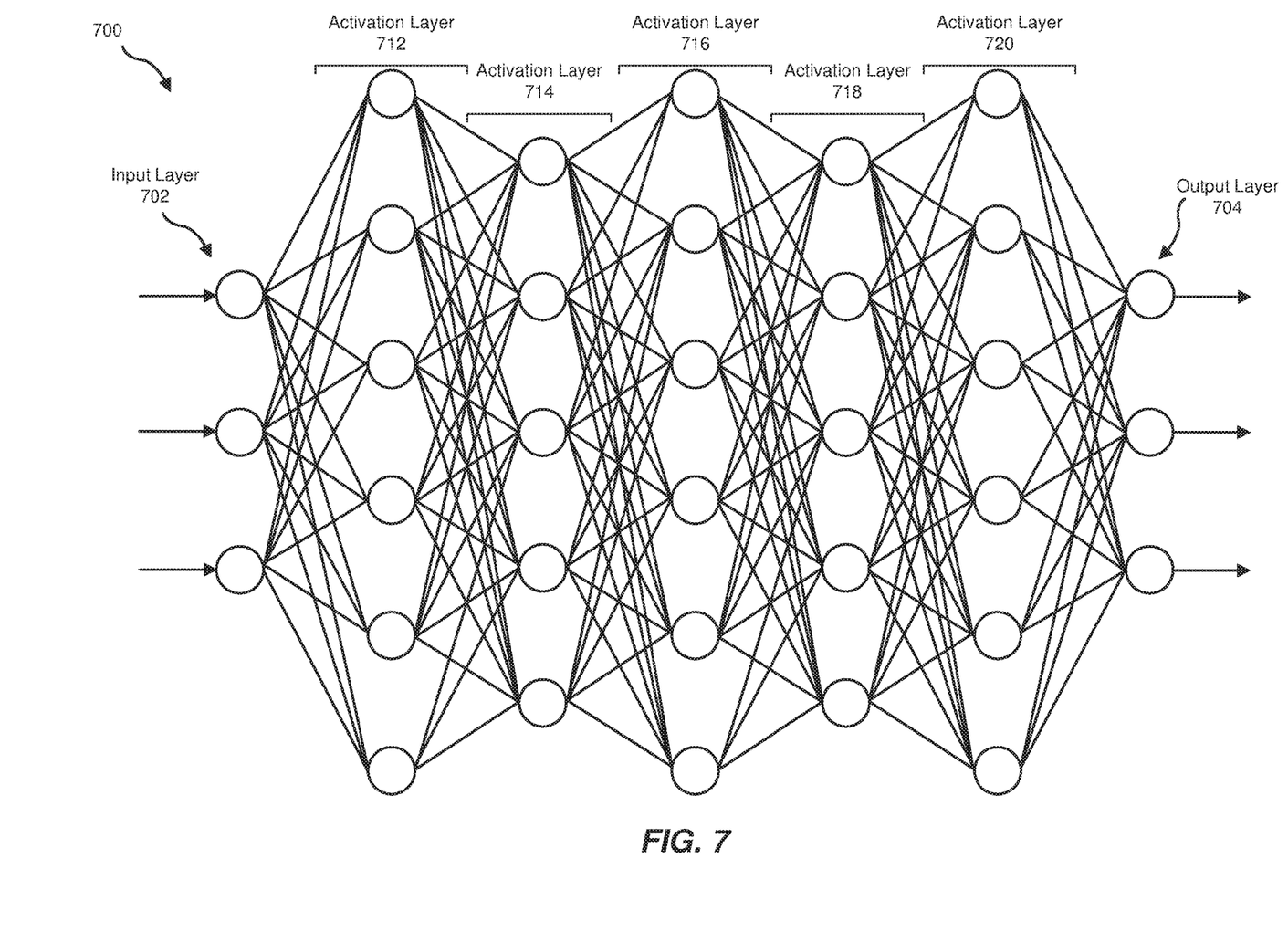
FIG. 7 is a diagram of an exemplary neural network in which the method of FIG. 4 may be implemented.

As detailed above, the systems and methods disclosed herein may be applied to a variety of AI-specific computing tasks and workloads. FIG. 7 is a block diagram of an exemplary feed-forward neural network 700 that may benefit from the power-management scheme disclosed herein. Neural network 700 may include an input layer 702, an output layer 704, and a series of five activation layers—activation layer 712, activation layer 714, activation layer 716, activation layer 718, and activation layer 720. While FIG. 7 provides an example with five activation layers, neural network 700 may include any other suitable number of activation layers (e.g., one activation layer, dozens of activation layers, thousands of activation layers, etc.).

In the example shown in FIG. 7, data flows from input layer 702 through activation layers 712-720 to output layer 704 (i.e., from left to right). As shown, each value from the nodes of input layer 702 may be duplicated and sent to the nodes of activation layer 712. At activation layer 712, a set of weights (i.e., a filter) may be applied to the layer inputs, and each node may output a weight to activation layer 714. This process may be repeated at each activation layer in sequence to create outputs at layer 704. As detailed above, this regular, repeated approach may enable instruction stream analysis unit 120 to accurately predict the power-usage requirement of an AI accelerator processing an instruction stream associated with neural network 700 and, thus, optimize the power usage and/or performance of the AI accelerator accordingly.

Figure 8:
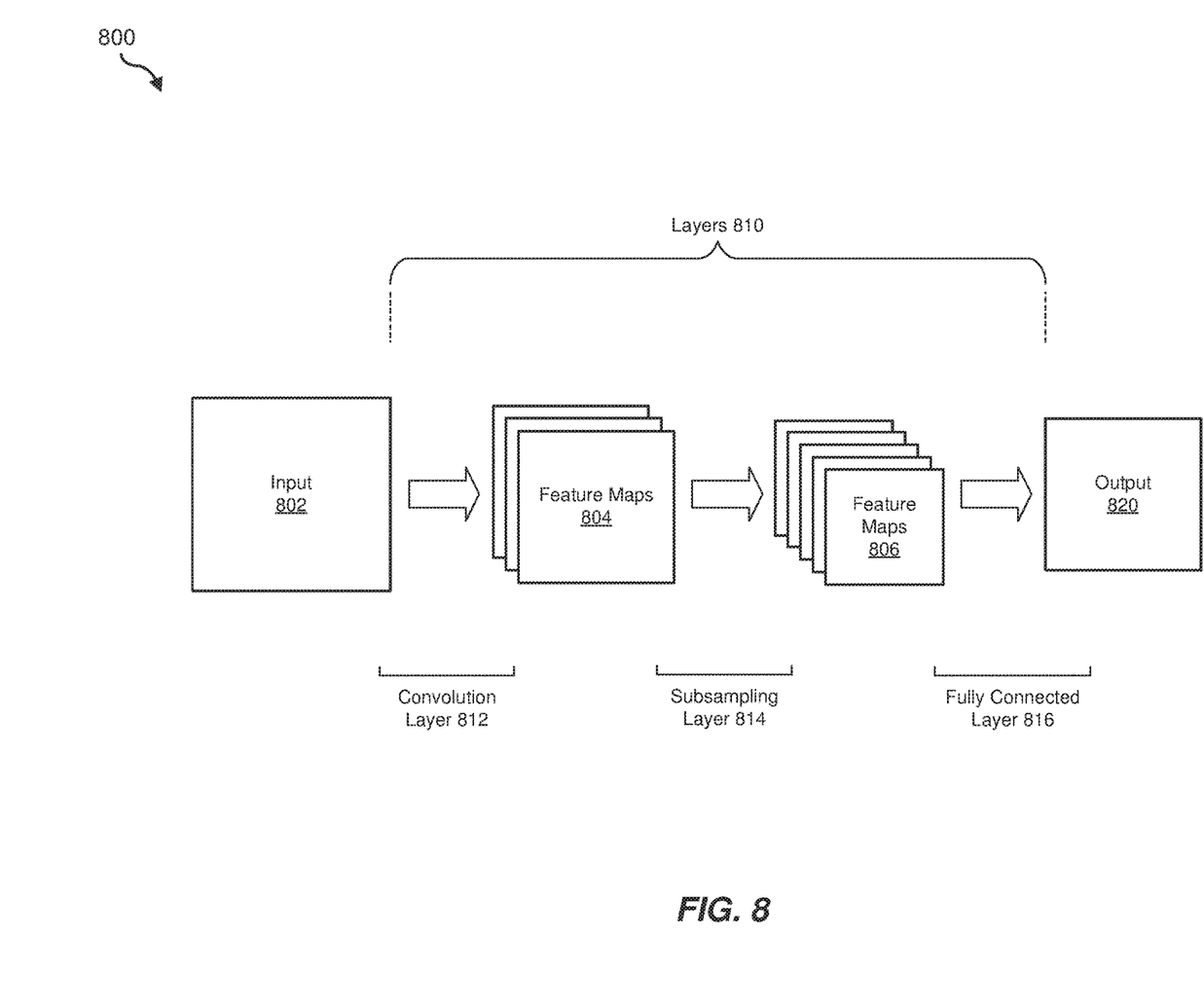
FIG. 8 is a block diagram of an exemplary convolutional neural network in which the method of FIG. 4 may be implemented.

While FIG. 7 shows one way to conceptualize a neural network, there are a variety of other ways to illustrate and conceptualize neural networks. For example, FIG. 8 shows a neural network 800 with a variety of different types of layers 810 (some of which may be fully connected feed-forward layers, such as those shown in FIG. 8). In convolution layer 812, an input 802 may undergo convolutional transformations, which may be calculated by hardware such as processing unit 310, hardware accelerator 200, etc. For example, input 802 may undergo convolutions based on the filters and quantization parameters of convolution layer 812 to produce feature maps 804. In some embodiments, convolution layer 812 may also include a rectification sublayer (e.g., a rectified linear unit, or RELU) with an activation function.

FIG. 8 also shows that feature maps 804 output by convolution layer 812 may undergo subsampling (e.g., pooling), based on the filters and parameters of subsampling layer 814, to produce feature maps 806, which may be reduced-size feature maps. The convolution and subsampling of layers 812 and 814 may be performed a single time or multiple times before sending an output (e.g., feature maps 806) to a fully connected layer, such as fully connected layer 816. Fully connected layer 816, which FIG. 8 shows one example of, may process feature maps 306 to identify the most probable inference or classification for input 802 and may provide this classification or inference as output 820. As with neural network 700, the regular, repeated approach followed by neural network 800 (e.g., convolve→rectify→pool) may enable instruction stream analysis unit 120 to both (1) accurately predict the power-usage requirement of an AI accelerator processing an instruction stream associated with neural network 800 and (2) optimize the power usage and/or performance of the AI accelerator accordingly.

Figure 9:
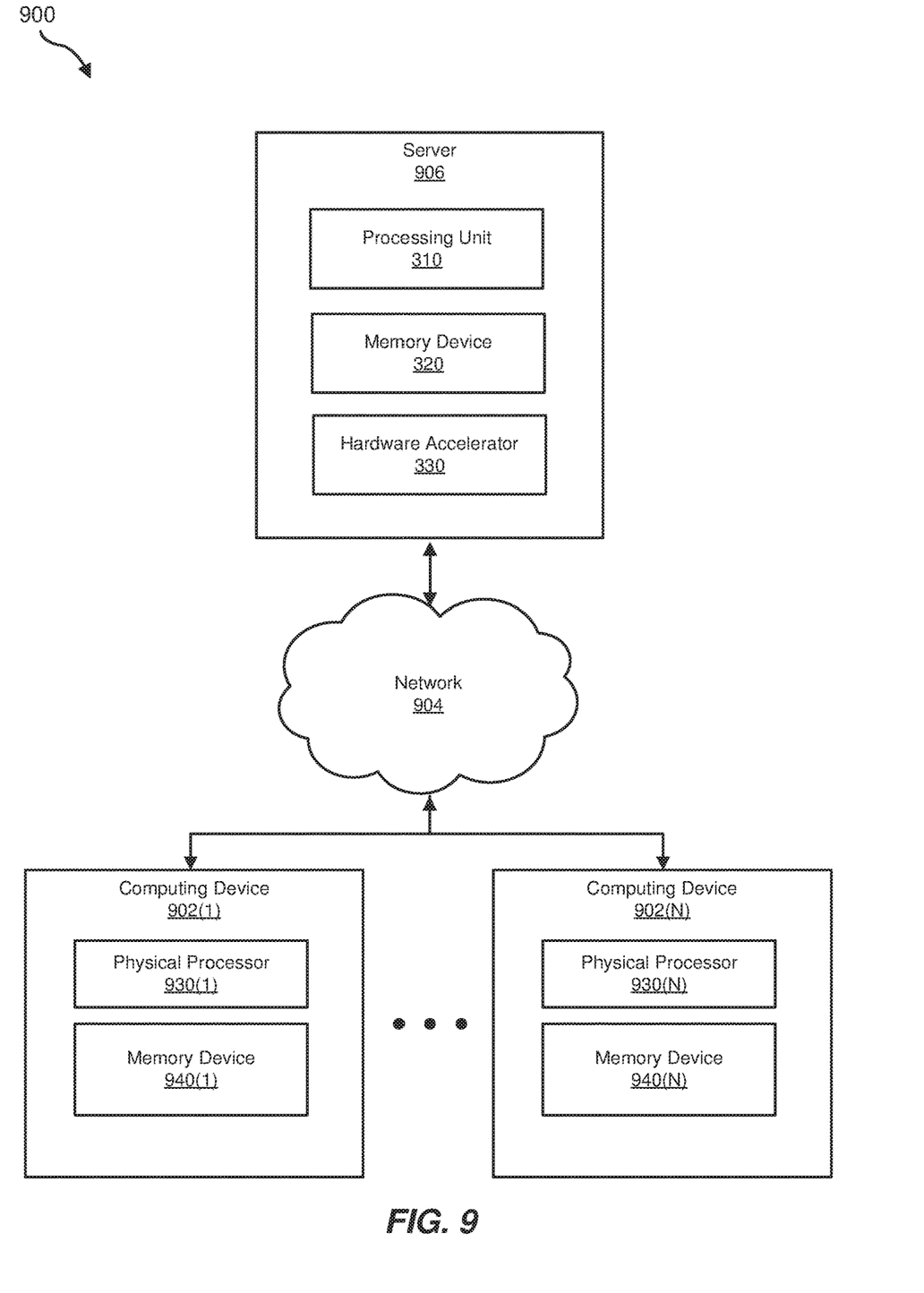
FIG. 9 is a block diagram of an exemplary system in which the method of FIG. 4 may be implemented.

FIG. 9 illustrates an exemplary network environment 900 (such as a social network environment) in which aspects of the present disclosure may be implemented. As shown, network environment 900 may include a plurality of computing devices 902(1)-(N), a network 904, and a server 906. Computing devices 902(1)-(N) may each represent a client device or a user device, such a desktop computer, laptop computer, tablet device, smartphone, or other computing device. Each of computing devices 902(1)-(N) may include a physical processor (e.g., physical processors 930(1)-(N)), which may represent a single processor or multiple processors, and a memory device (e.g., memory devices 940(1)-(N)), which may store instructions (e.g., software applications) or data.

Computing devices 902(1)-(N) may be communicatively coupled to server 906 through network 904. Network 904 may be any communication network, such as the Internet, a Wide Area Network (WAN), or a Local Area Network (LAN), and may include various types of communication protocols and physical connections.

As with computing devices 902(1)-(N), server 906 may represent a single server or multiple servers (e.g., a data center). Server 906 may host a social network or may be part of a system that hosts the social network. Server 906 may include a data storage subsystem 920, which may store instructions as described herein, and a hardware processing unit 960 and a hardware accelerator 330, which may include one or more processors and data storage units used for performing AI-specific computing tasks.

The term "processing unit" may, in some examples, refer to various types and forms of computer processors. In some examples, a hardware processing unit may include a central processing unit and/or a chipset corresponding to a central processing unit. Additionally or alternatively, a hardware processing unit may include a hardware accelerator (e.g., an AI accelerator, a video processing unit, a graphics processing unit, etc.) and may be implemented via one or more of a variety of technologies (e.g., an ASIC, an FPGA, etc.).

As noted, server 906 may host a social network, and in such embodiments, computing devices 902(1)-(N) may each represent an access point (e.g., an end-user device) for the social network. In some examples, a social network may refer to any type or form of service that enables users to connect through a network, such as the Internet. Social networks may enable users to share various types of content, including web pages or links, user-generated content such as photos, videos, posts, and/or to make comments or message each other through the social network.

In some embodiments, server 906 may access data (e.g., data provided by computing devices 902(1)-(N)) for analysis. For example, server 906 may perform (using, e.g., hardware accelerator 330) various types of AI or ML tasks on data. For instance, server 906 may use AI or ML algorithms to rank feeds and search results, to identify spam, pornography, and/or other misleading content, to perform speech recognition (e.g., to automatically caption videos), to automate translation from one language to another, to enable natural language processing, to enable computer vision (e.g., to identify objects in images, to turn panoramic photos into interactive 360 images, etc.), and/or to perform a variety of other tasks. As with neural networks 700 and 800, server 906 (and hardware accelerator 330) may benefit from the power-management scheme disclosed herein due to the often regular and repeated nature of these tasks.

Embodiments of the instant disclosure may also be applied to various environments in addition to or instead of social networking environments. For example, the systems and methods disclosed herein may be used in video game development and game play (e.g., in reinforcement-learning techniques), to automate robotics tasks (e.g., grasping, stabilization, navigation, etc.), in medical research (e.g., genomics, cancer research, etc.), for autonomous vehicle navigation, and/or in any other suitable context.

In addition to being applied in a variety of technical fields, embodiments of the instant disclosure may also be applied to numerous different types of neural networks. For example, the systems and methods described herein may be implemented in any AI scheme that is designed to provide brain-like functionality via artificial neurons. In some examples (e.g., recurrent neural networks and/or feed-forward neural networks), these artificial neurons may be non-linear functions of a weighted sum of inputs that are arranged in layers, with the outputs of one layer becoming the inputs of a subsequent layer.

Although some of the examples herein are discussed in the context of AI accelerators, aspects of the present disclosure may be applied to other hardware processing systems in which a workload may be predictable and/or static. As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" may refer to any type or form of volatile or non-volatile storage device or medium capable of storing data and/or computer-readable instructions. In one example, a memory device may store, load, and/or maintain modules containing the computing tasks described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, CPUs, FPGAs that implement softcore processors, ASICs, portions of one or more of the same, variations or combinations of one or more of the same, or any other suitable physical processor.

In some examples, the various steps and/or computing asks described herein may be contained within or represent portions of one or more modules or applications. In addition, in certain embodiments one or more of these modules may represent one or more software applications or programs that, when executed by a computing device, may cause the computing device to perform one or more tasks. For example, one or more of the computing tasks or steps described and/or illustrated herein may represent modules stored and configured to run on one or more of the computing devices or systems described and/or illustrated herein. One or more of these computing tasks may also represent all or portions of one or more special-purpose computers configured to perform one or more tasks.

In addition, one or more of the computing tasks described herein may transform data, physical devices, and/or representations of physical devices from one form to another. For example, a module or device may receive an instruction stream to be transformed, transform the instruction stream, output a result of the transformation to predict a power-usage requirement for an AI accelerator, and use the result of the transformation to dynamically modify power supplied to the AI accelerator. Additionally or alternatively, one or more of the computing tasks recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computing device comprising:
   a plurality of special-purpose, hardware accelerator functional units configured to perform artificial-intelligence-specific computing tasks;
   a memory device; and
   an instruction stream analysis unit coupled to the memory device and the plurality of functional units, the instruction stream analysis unit configured to:
   receive an instruction stream that comprises one or more instructions for performing at least one artificial-intelligence-specific computing task with at least a first hardware functional unit of the plurality of functional units and a second hardware accelerator functional unit of the plurality of functional units, wherein the first functional unit is distinct from the second functional unit;
   predict, based on an analysis of at least a portion of the instruction stream, a power-usage requirement for the first and second hardware accelerator functional units when executing the instruction stream; and
   limit, based on the power-usage requirement, an operating capacity of the first hardware accelerator functional unit and an operating capacity of the second hardware accelerator functional unit by modifying power supplied to the first and second hardware accelerator functional units.

2. The computing device of claim 1, wherein the instruction stream analysis unit predicts the power-usage requirement for at least one of the functional units by:
   causing at least one of the functional units to execute a portion of the instruction stream;
   observing utilization of the functional units when executing the portion of the instruction stream; and
   forecasting, based at least in part on the observed utilization of the functional units when executing the portion of the instruction stream, a power-usage requirement for at least one of the functional units when executing a remaining portion of the instruction stream.

3. The computing device of claim 1, wherein the memory device is configured to store a power-utilization profile for at least one artificial intelligence program, and wherein the power-utilization profile identifies the power-usage requirement for at least one of the functional units when executing the artificial intelligence program.

4. The computing device of claim 3, wherein the instruction stream analysis unit predicts the power-usage requirement for at least one of the functional units by:
   determining that the instruction stream corresponds to the artificial intelligence program;
   retrieving the power-utilization profile for the artificial intelligence program from the memory device; and
   determining, based on the power-utilization profile, the power-usage requirement for at least one of the functional units when executing the artificial intelligence program.

5. The computing device of claim 1, wherein the instruction stream analysis unit predicts the power-usage requirement by:
   identifying, based on the analysis of the instruction stream, at least one element of sparsity within the artificial-intelligence-specific computing task; and
   predicting the power-usage requirement based at least in part on the identified element of sparsity.

6. The computing device of claim 1, wherein at least one of the functional units is power gated to draw power only when in use.

7. The computing device of claim 1, wherein the instruction stream analysis unit modifies the power supplied to at least one of the functional units by scaling a frequency of at least one of the functional units.

8. The computing device of claim 1, wherein the instruction stream analysis unit modifies the power supplied to at least one of the functional units by scaling a voltage supplied to at least one of the functional units.

9. The computing device of claim 1, wherein the instruction stream analysis unit comprises at least one of:
   a general-purpose processing unit;
   a special-purpose processing unit; or
   a logical operation unit.

10. The computing device of claim 1, wherein the instruction stream analysis unit is at least one of:
    integrated within a hardware accelerator that comprises the functional units; or
    external to the hardware accelerator.

11. The computing device of claim 1, wherein the functional units comprise at least one of:
    a multiply-accumulate unit;
    a direct memory access unit; or
    a second memory device.

12. A hardware accelerator comprising:
    a plurality of special-purpose, hardware-based functional units configured to perform artificial-intelligence-specific computing tasks; and
    an instruction stream analysis unit coupled to the plurality of functional units and a cache, the instruction stream analysis unit configured to:
       receive an instruction stream that comprises one or more instructions for performing at least one artificial-intelligence-specific computing task with at least a first functional unit of the plurality of functional units and a second functional unit of the plurality of functional units, wherein the first functional unit is distinct from the second functional unit;
       predict, based on an analysis of at least a portion of the instruction stream, a power-usage requirement for the at least one of the functional units when executing the instruction stream; and
       limit, based on the power-usage requirement, an operating capacity of the first and second functional units by modifying power supplied to the first and second functional units.

13. A computer-implemented method comprising:
    receiving an instruction stream that comprises one or more instructions for performing at least one artificial-intelligence-specific computing task;
    identifying a plurality of special-purpose, hardware accelerator functional units configured to perform artificial-intelligence-specific computing tasks;
    predicting, based on an analysis of at least a portion of the instruction stream, a power-usage requirement for at least a first hardware accelerator functional unit of the functional units and a second hardware accelerator functional unit of the functional units when executing the instruction stream, wherein the first hardware accelerator function unit is distinct from the second hardware accelerator functional unit; and
    limiting, based on the power-usage requirement, an operating capacity of the first and second hardware accelerator functional units by modifying power supplied to the first and second hardware accelerator functional units.

14. The computer-implemented method of claim 13, wherein predicting the power-usage requirement for at least one of the functional units comprises:
    executing a portion of the instruction stream;
    observing utilization of the functional units when executing the portion of the instruction stream; and
    forecasting, based at least in part on the observed utilization of the functional units when executing the portion of the instruction stream, a power-usage requirement for at least one of the functional units when executing a remaining portion of the instruction stream.

15. The computer-implemented method of claim 13, further comprising, prior to receiving the instruction stream, storing a power-utilization profile for at least one artificial intelligence program, wherein the power-utilization profile identifies the power-usage requirement for at least one of the functional units when executing the artificial intelligence program.

16. The computer-implemented method of claim 15, wherein predicting the power-usage requirement for at least one of the functional units comprises:
    determining that the instruction stream corresponds to the artificial intelligence program;
    retrieving the power-utilization profile for the artificial intelligence program from a memory device; and
    determining, based on the power-utilization profile, the power-usage requirement for at least one of the functional units when executing the artificial intelligence program.

17. The computer-implemented method of claim 13, wherein predicting the power-usage requirement further comprises:
    identifying, based on the analysis of the instruction stream, at least one element of sparsity within the artificial-intelligence-specific computing task; and
    predicting the power-usage requirement based at least in part on the identified element of sparsity.

18. The computer-implemented method of claim 13, wherein at least one of the functional units is power gated to draw power only when in use.

19. The computer-implemented method of claim 13, wherein modifying the power supplied to at least one of the functional units comprises scaling a frequency of at least one of the functional units.

20. The computer-implemented method of claim 13, wherein modifying the power supplied to at least one of the functional units comprises scaling a voltage supplied to at least one of the functional units.

\* \* \* \* \*

UNITED STATES PATENT AND TRADEMARK OFFICE
CERTIFICATE OF CORRECTION

PATENT NO. : 10,671,147 B2
APPLICATION NO. : 15/846117
DATED : June 2, 2020
INVENTOR(S) : Nadav Rotem et al.

Page 1 of 1

It is certified that error appears in the above-identified patent and that said Letters Patent is hereby corrected as shown below:

On the Title Page

In Column 2, item (56), Other Publications, Line 1, delete "et. al," and insert -- et al., -- therefor.

On page 2, in Column 2, item (56), Other Publications, Line 1, delete "et. al," and insert -- et al., -- therefor.

On page 2, in Column 2, item (56), Other Publications, Line 5, delete "et. al," and insert -- et al., -- therefor.

Signed and Sealed this
Twenty-first Day of July, 2020

Andrei Iancu
*Director of the United States Patent and Trademark Office*